Patented Mar. 30, 1943

2,315,465

UNITED STATES PATENT OFFICE 2,315,465

DENTAL IMPRESSION MATERIAL

Vance V. Vallandigham, Chicago, Ill., assignor to Coe Laboratories, Inc., Chicago, Ill., a corporation of Illinois No Drawing. Application July 21, 1941, Serial No. 403,363

25 Claims. (Cl. 18—47)

This invention relates generally to impression materials, and, more particularly, to impression materials adapted for use in taking dental impressions.

In dentistry the field of dental prosthesis is of singular importance in making the requisite replacements and adjustments of the teeth as the situation requires. To obtain accurate impressions of the oral parts the dental profession demands materials of exacting physical characteristics, and it is to meet this demand that the present invention is directed.

Therefore, a primary object of this invention is to provide impression materials suitable for use in taking dental impressions of a high degree of accuracy.

Another object of the invention is to provide improved dental impression materials which can be quickly prepared when needed, and which may be used with a minimum of inconvenience even to uncooperative patients.

Other and ancillary objects and advantages of the invention will become apparent to those skilled in the art from the following description and explanation of the invention.

The principle underlying my invention is the controlled congelation of a gel forming substance in the presence of an inert material to give the resulting gel the desired structural and physical characteristics. Accordingly, a composition representing an embodiment of my invention will preferably contain (1) a gel forming material, (2) an ingredient to cause congelation of the gel forming material, and (3) an inert, or substantially inert, substance to provide the necessary body and structural strength for the resulting congealed mass. While these ingredients will themselves form a satisfactory final product in many cases, the congelation is difficult to control, and therefore, I have found it advantageous to include a further ingredient which is calculated to control the period of congelation within any desired limits. In taking dental impressions, this period of congelation is preferably short, for instance substantially two to four minutes. This gives the dentist ample time to mix the impression material thoroughly with water and allows from substantially one to two minutes for the material to gel in the patient's mouth.

As the gel forming material, I use a water-soluble salt of pectic acid, which acid is a product of many varieties of citrus fruits and apples. Of these soluble salts of pectic acid I have found that the alkali-metal and ammonium pectates are suitable, although I prefer to employ the sodium and potassium salts. I do not intend to limit the scope of my invention to the above mentioned pectates, but contemplate in addition, all of the salts, esters, and other organic compounds of pectic acid capable of solution in water and of precipitation by any of the congealing compounds mentioned below. As examples of these water soluble pectates may be mentioned the reaction products of pectic acid with the amines, such as mono-, di-, and tri-ethanolamine, alkylene diamines, and hexamethylenetetramine.

As the ingredient to cause congelation of the gel forming material, the salts of calcium and barium have been found useful. The following compounds have definite congealing properties when mixed with pectates: the acetate, chloride, lactate, malate, nitrate, sulfate, and oxide of calcium; the chlorate, chloride, nitrate, sulfate and sulfide of barium. In addition to these, the soluble and slightly soluble salts of aluminum, beryllium, magnesium, cadmium, strontium and zinc may be used as the congelation ingredient. I have preferably used calcium sulfate, calcium oxide, and calcium malate to bring about the desired gel; however, any of the compounds above listed, as well as any other compound which will react with the pectate to form an insoluble precipitate, may be used as well.

The inert, or substantially inert, component of my impression material may be selected from a large number of substances known in the art as fillers. A few of these are magnesium carbonate, calcium carbonate, kaolin, powdered silica, titanium dioxide, China clay, B. C. Volclay (a product of the American Colloid Co.), calcium citrate, tri-calcium phosphate, diatomaceous earth, and di-calcium phosphate. Fibrous materials such as silk, cotton, or rubber fibers may be added with the filler for reenforcement purposes.

Before proceeding to a discussion of the members of the fourth group of ingredients, namely those compounds which exert a controlling influence on the gelling period of the pectates, a brief statement of what is believed to be the mechanism of the reactions involved will be given, illustrated by examples.

Example I

The following ingredients are finely powdered and mixed to a homogeneous mass:

|  | Grams |
|---|---|
| Potassium pectate | 2.0 |
| Tri-potassium phosphate | 0.5 |
| Calcium sulfate | 1.12 |
| Magnesium carbonate | 12.0 |

This entire mass is then mixed with water in the amount of substantially one part by weight of the dry ingredients to about two and one-half parts by weight of water. The mixture is stirred and worked rapidly with a spatula for two to three minutes to maintain in paste form the homogeneity of the powder. The mass is then ready for insertion into the patient's mouth, wherein it will set to a firmness permitting removal in from about 1½ to 3 minutes.

The principal reacting substances in this example are calcium sulfate and potassium pectate, and the mechanism is that of a double decomposition reaction:

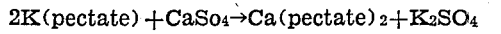

2K(pectate) + CaSO₄ → Ca(pectate)₂ + K₂SO₄

Potassium   Calcium   Calcium   Potassium
pectate    sulfate    pectate    sulfate Manifestly, the pectate will gel or "set up" immediately a precipitating ion, such as calcium, is permitted to come in contact with the pectate ion. This period of congelation would be much too short for practical purposes; therefore, I have found it advisable to extend the period by placing in the field of reaction a material which will precipitate the calcium ions as they are formed until a predetermined period of time has elapsed, after which the congelation reaction will proceed rapidly and completely.

These buffers, or gel-controlling materials, constitute the fourth group of ingredients referred to above, and comprise in general the water soluble salts of acids the anions of which form insoluble or slightly soluble precipitates with calcium.

An illustration of the buffing action will now be given using the ingredients of Example I. After the components of this example are placed in water, the calcium sulfate immediately starts dissolving, liberating calcium ions. It is not advisable to permit these calcium ions to contact the pectate ions until substantially the whole of the potassium pectate has been dispersed in the water, since to do so would result in a granular and unsatisfactory gel; also, as has been previously pointed out, such a gel would "set up" too quickly to be of practical value. It is at this point that the buffer (tri-potassium phosphate) comes into play. As the calcium ions are liberated, they are immediately precipitated as calcium phosphate, thereby delaying the congelation until substantially all the buffer has been used. It can be seen that this delayed action can be controlled at will, simply by regulating the quantity of buffer used. To exert any buffing action on the pectate congealing ingredient the buffer must produce the precipitating anion at least as rapidly as the pectate congealing ingredient produces the calcium, barium, or strontium cation. Therefore, the buffer should have a solution rate at least as fast as that of the pectate congealing ingredient.

As the buffing agent in my impression materials, I have found that the water soluble carbonates, citrates, oxalates, and phosphates, the cations of which will not precipitate the pectate, are particularly effective. It is apparent that these buffing agents may be used as salts of these acids, or, when they do not exert a deleterious influence on the hydrogen ion concentration of the solution, they may be employed in their free acid form. It is important to maintain a pH of 6.8 to 8.5 in the gel solution since higher or lower pH values will result in impressions which yield soft, powdery surfaces on the positive plaster casts made therefrom. I have obtained very satisfactory results using the ingredients of the preferred embodiment of my invention (Example I) as well as in the examples to follow.

I have further discovered that the by-product of the reaction between the pectate and the setting or gelling agent may greatly affect the character of the surface of the plaster model obtained from the impression. For example, when potassium pectate and calcium sulphate react, calcium pectate precipitates as a gel, and potassium sulphate is left in solution as a by-product. Potassium sulphate has been found to accelerate the setting of the plaster model and impart to it a very hard, smooth surface—a very desirable feature. However, if in this illustration sodium pectate is substituted for potassium pectate, the by-product will be sodium sulphate, which is definitely a retarder to the setting of the plaster model made therein, resulting in a soft, powdery surface of the model. Accordingly, I prefer to use such ingredients in my impression materials which will maintain a pH between 6.8 and 8.5, and which will yield a by-product other than sodium sulphate, preferably, potassium sulphate.

Additional examples, representing modifications of my invention, will now be given. In all the examples below, the water content should be two and one-half times the combined weight of the solid ingredients. The procedure followed in testing the impression materials represented by the examples comprises mixing the powdered ingredients with the water and spatulating for from 2 to 3 minutes, pouring the resulting paste in a tray, placing the paste-filled tray in the patient's mouth until the gel sets, and removing and examining the appearance and mold characteristics of the impression.

*Example II*

|   | Grams |
|---|---|
| Potassium pectate | 2.0 |
| Tri-potassium phosphate | 0.5 |
| Calcium oxide | 0.5 |
| Magnesium carbonate | 12.0 |

This modification illustrates an alternative pectate precipitant, i. e., calcium oxide for calcium sulphate.

The following example is a variant of preferred Example I, and employs potassium oxalate as an alternative gel-controlling (buffing) agent, and kaolin as an alternative inert filler:

*Example III*

|   | Grams |
|---|---|
| Potassium pectate | 2.0 |
| Potassium oxalate | 0.5 |
| Calcium sulfate | 1.12 |
| Kaolin | 12.0 |

Other modifications are:

*Example IV*

|   | Grams |
|---|---|
| Sodium pectate | 2.0 |
| Tri-sodium phosphate | 0.5 |
| Calcium oxide | 0.5 |
| Magnesium carbonate | 12.0 |

*Example V*

|   | Grams |
|---|---|
| Potassium pectate | 8.0 |
| Tri-potassium phosphate | 0.5 |
| Calcium sulfate | 1.12 |
| Magnesium carbonate | 48.0 |

This example showed a very fine set in about six minutes, setting up with rubber-like consistency. Example V demonstrates the wide range over which the quantities of pectate and the inert filler may be varied without appreciably affecting the quality of the final impression. Of course, the gel-controlling (buffer) member and the gel precipitating member may also be varied in quantity without materially affecting the quality of the impression, so long as there is sufficient buffer material to precipitate the gel-precipitating ions as they are produced until the setting time has been reached. Thus it can be seen that impression materials of any desired setting time, and of any consistency and resiliency, may be obtained simply by varying the proportions of the several ingredients between reasonable limits.

In all of the above examples I preferably have added water to the dry mixture of the ingredients. Obviously, there are other ways in which the ingredients may be mixed to give the same result. For instance, the water may be used first to disperse the pectate, after which the remaining solids may be added; or part of the water may be used to disperse the pectate, and the remainder mixed with the other solids, before the constituents are brought together. These and other similar methods of preparing my impression materials are intended to be included within the scope of my invention.

Further examples are as follows:

*Example VI*

|  | Grams |
|---|---|
| Potassium pectate | 16 |
| Tri-potassium phosphate | .5 |
| Calcium sulphate | 1.12 |
| Magnesium carbonate | 96 |

*Example VII*

|  | Grams |
|---|---|
| Potassium pectate | 16 |
| Tri-potassium phosphate | .5 |
| Calcium sulphate | 1.12 |
| Magnesium carbonate | 48 |

In practice, the calcium sulphate or other material for bringing about the desired gel is preferably employed in amount substantially completely to precipitate the pectate. The filler is preferably confined to an amount which will be effectively held together by the pectate. The buffer material will be used in amount to secure the desired setting time, and more particularly in such amount that it will precipitate substantially all of the calcium ions which are formed until it is desired for the calcium ions to be free to react with the pectate to produce the desired set.

I have observed that the purity of the constituents of my impression materials may influence the character of the resulting gel. For instance, reagent type magnesium carbonate as a filler produces a finer-pored, more resilient structure than the U. S. P. product. However, I do not intend to limit my invention to materials of any specific degree of purity, nor only to those materials employed in the examples set forth, since obvious modifications will occur to any person skilled in the art.

Moreover, while I have described my invention in relation to its application in dental science, I do not intend so to limit its use, but rather to extend its application to all cases where a resilient, accurate impression material may be of utility.

Having described my invention, what I claim and desire to protect by Letters Patent is:

1. An impression material comprising a member of the group consisting of sodium, potassium, and ammonium pectate, and a member of the group consisting of the soluble and slightly soluble salts of calcium, barium and strontium.

2. An impression material comprising a member of the group consisting of sodium, potassium, and ammonium pectate, a member of the group consisting of the soluble and slightly soluble salts of calcium, barium, and strontium, and a substantially inert filler.

3. An impression material comprising a member of the group consisting of sodium, potassium, and ammonium pectate, a member of the group consisting of the soluble and slightly soluble salts of calcium, barium, and strontium, a substantially inert filler, and a member of the group consisting of the soluble and slightly soluble carbonates, citrates, oxalates, and phosphates.

4. An impression material comprising a member of the group consisting of sodium, potassium, and ammonium pectate, a member of the group consisting of the soluble and slightly soluble salts of calcium, barium, and strontium, a substantially inter filler, and tri-potassium phosphate.

5. An impression material comprising a member of the group consisting of sodium, potassium, and ammonium pectate, a member of the group consisting of the soluble and slightly soluble salts of calcium, barium, and strontium; magnesium carbonate, and tri-potassium phosphate.

6. An impression material comprising a member of the group consisting of sodium, potassium, and ammonium pectate; calcium sulfate, magnesium carbonate, and tri-potassium phosphate.

7. An impression material comprising potassium pectate, calcium sulfate, magnesium carbonate, and tri-potassium phosphate.

8. An impression material comprising a member of the group consisting of sodium, potassium, and ammonium pectate, calcium sulfate, a substantially inert filler, and tri-potassium phosphate.

9. An impression material comprising potassium pectate, calcium sulfate, a substantially inert filler, and tri-potassium phosphate.

10. An impression material comprising potassium pectate, a member of the group consisting of the soluble and slightly soluble salts of calcium, barium, and strontium, a substantially inert filler, and a member of the group consisting of the soluble and slightly soluble carbonates, citrates, oxalates, and phosphates.

11. An impression material comprising potassium pectate, calcium sulfate, a substantially inert filler, and a member of the group consisting of the soluble and slightly soluble carbonates, citrates, oxalates, and phosphates.

12. An impression material comprising a member of the group consisting of sodium, potassium, and ammonium pectate; calcium sulfate, magnesium carbonate, and a member of the group consisting of the soluble and slightly soluble carbonates, citrates, oxalates, and phosphates.

13. An impression material comprising potassium pectate, a member of the group consisting of the soluble and slightly soluble salts of calcium, barium, and strontium; magnesium carbonate, and a member of the group consisting of the soluble and slightly soluble carbonates, citrates, oxalates, and phosphates.

14. An impression material comprising

|  | Grams |
|---|---|
| Potassium pectate | 2.0 |
| Tri-potassium phosphate | 0.5 |
| Calcium sulfate | 1.12 |
| Magnesium carbonate | 12.0 |

15. An impression material comprising the ingredients of claim 14 and water in the amount of substantially one part by weight of the dry ingredients to about two and one-half parts by weight of water.

16. An impression material comprising potassium pectate, tri-potassium phosphate, calcium oxide, and magnesium carbonate.

17. An impression material comprising sodium pectate, tri-sodium phosphate, calcium oxide, and magnesium carbonate.

18. The method of preparing an impression material which comprises thoroughly mixing in the dry state the materials in claim 14, adding water thereto, and spatulating the resulting paste until it becomes homogeneous.

19. The method of preparing an impression material which comprises mixing in the dry state a soluble pectate; a member of the group of precipitating compounds consisting of the soluble and slightly soluble salts of the alkaline-earth metals, zinc, cadmium and aluminum; a substantially inert filler; and a member of the group consisting of the soluble and slightly soluble carbonates, citrates, oxalates, and phosphates; adding water thereto, and homogenizing the resultant paste.

20. The method of preparing an impression material which comprises mixing in the dry state calcium sulfate and tri-potassium phosphate and homogenizing said mixture with an aqueous solution of a pectate.

21. The method of preparing an impression material which comprises mixing in the dry state calcium sulfate and tri-potassium phosphate and homogenizing said mixture with an aqueous solution of potassium pectate.

22. An impression material comprising a soluble pectate and a member of the group of precipitating compounds consisting of the soluble and slightly soluble salts of the alkaline-earth metals, zinc, cadmium, and aluminum.

23. An impression material comprising a soluble pectate and a soluble or slightly soluble compound capable of precipitating said pectate in an aqueous medium.

24. An impression material comprising a soluble pectate; a member of the group of precipitating compounds consisting of the soluble and slightly soluble salts of the alkaline-earth metals, zinc, cadmium, and aluminum; and a substantially inert filler.

25. An impression material comprising a soluble pectate; a member of the group of precipitating compounds consisting of the soluble and slightly soluble salts of the alkaline-earth metals, zinc, cadmium, and aluminum; a substantially inert filler; and a member of the group consisting of the soluble carbonates, citrates, oxalates, and phosphates, the solution rate of the latter member being not less than that of the precipitating compound.

VANCE V. VALLANDIGHAM.